Dec. 27, 1927.　　　　　　　　　　　　　　　　　1,653,770
R. KAUCH ET AL
PILOT DIRECTOR FOR AIRCRAFT
Filed Feb. 1, 1926
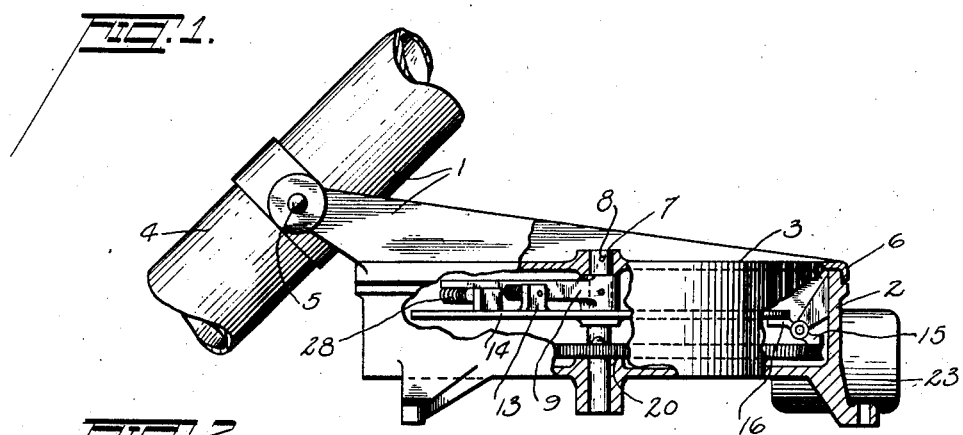
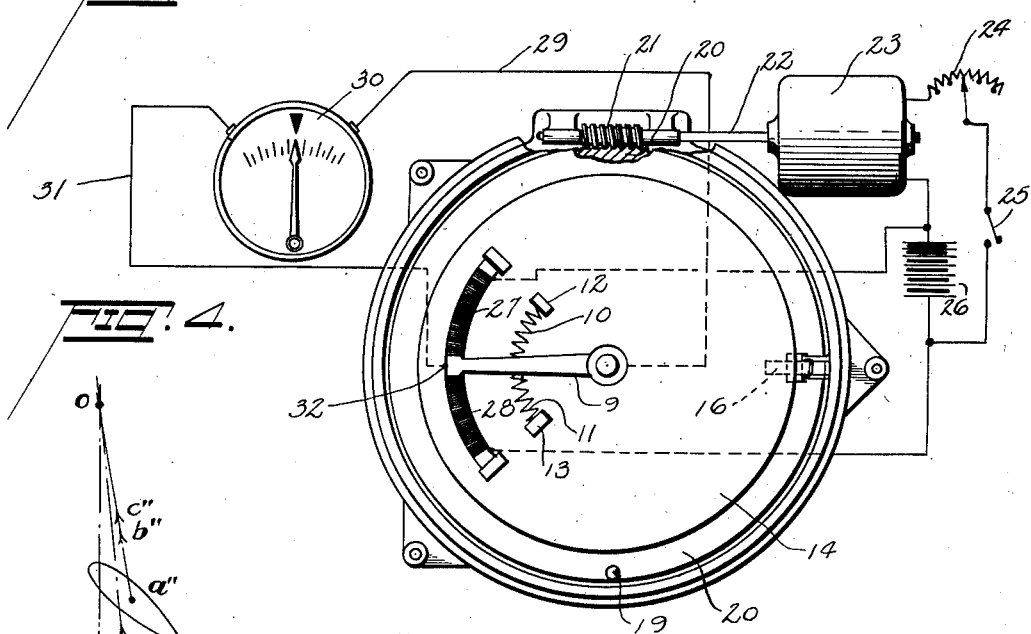
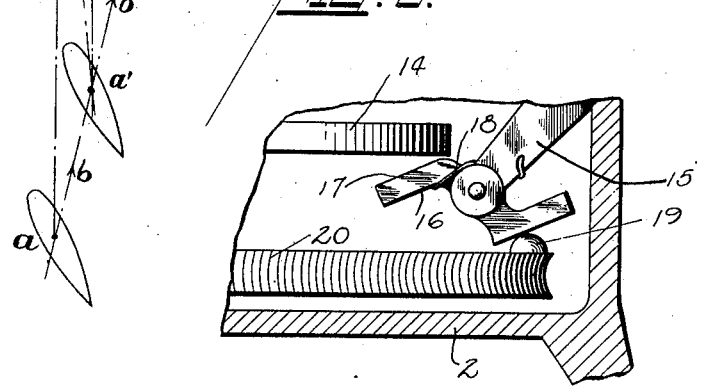
INVENTORS
ROBERT KAUCH
CHARLES L. PAULUS
BY
Robert A. Young
ATTORNEY Patented Dec. 27, 1927.

1,653,770

UNITED STATES PATENT OFFICE.

ROBERT KAUCH AND CHARLES L. PAULUS, OF DAYTON, OHIO.

PILOT DIRECTOR FOR AIRCRAFT.

Application filed February 1, 1926. Serial No. 85,408.

This invention relates to pilot directors for aircraft by which an observer can communicate to his pilot the direction in which the craft should be steered so that the craft will fly directly over the target.

It is the primary object of this invention to provide an instrument which will make known to the pilot the direction in which the craft should be steered, this indication taking place automatically as the bomber or observer sights the object which it is intended to bomb or against which the fire of the guns is to be directed. This invention contemplates the use of a movable reference so that the indications observable on the pilot's indicator will show the movement of the sighting device in relation to the last position of the reference. This reference is automatically reset periodically so that it bears a certain predetermined normal relation with the sighting device. The variations in the line of the sighting device from its normal relation with the reference will be indicated on the pilot indicating instrument.

The reference of the instrument is connected by means of springs to the sighting device support which urge the reference and the sighting device to a certain relative normal relation. A holding mechanism operates normally to hold the reference in a fixed position upon the craft, and a cam operates to periodically release this holding means so that the spring will act to reset the reference automatically to its normal relation with the sighting device.

The use of an instrument in accordance with our invention will give a succession of indications to the pilot so that he may properly set the ship to fly directly towards the object sighted, the amount of the indications showing him how much the ship should be turned. We are aware that various forms of pilot directors are known, but in all of these a fixed reference is used, this reference being either fixed upon the craft or fixed in position after being aligned with the line of flight, or the apparent motion of the ground. In the instruments which have been previously used, the indication given to the pilot corresponds to the angle between the line from the craft to the target and the line of the reference. This prior construction causes over-correcting of the pilot as he follows the indications given him by the pilot director. This is true because of the fact that the indication of the pilot director is compounded upon the turning action of the airplane as it is directed towards the target.

It is therefore a main object of this invention to provide an instrument which is free from the objections mentioned and which will be accurate and dependable in use.

Further objects of our invention will be more fully set forth in the following description and in the claims.

Referring to the drawings, in which

Fig. 1 is a central vertical section through the observer's sighting device and the mount.

Fig. 2 is a plan view of the instrument showing the wiring connections to the pilot director.

Fig. 3 is a detailed view of the locking or holding device.

Fig. 4 is a diagrammatical view showing the motion of the aircraft while bombing an objective.

Referring particularly to the drawings by reference numerals, 1 is the observer's sighting device, which may be of the optical type and may be used either in bombing or in the directing of gun firing from the aircraft. This sighting device is carried or mounted upon a support frame 2 for rotational movements about a vertical axis. The sighting device 1 is composed of a mounting plate 3 and a sighting tube 4, which is mounted upon the horizontal axis 5, so that it may be directed at the target. The plate 3 is provided with downwardly projecting flanges 6 which engage with corresponding portions of the outside face of the frame 2. The plate 3 is attached to a vertical shaft 7 by means of the pin 8, this shaft 7 being supported in a suitable bearing at its lower end within the frame 2.

The shaft 7 has mounted thereon to rotate therewith an arm 9, which is interconnected by means of the opposed springs 10 and 11 to two blocks 12 and 13 respectively, fixed upon a disc or reference member 14, which is mounted for free pivotal movement about the shaft 7. This disc 14 forms a reference which is mounted to rotate about a vertical axis, which is urged to a definite normal relation as regards the sighting device 1, by means of the arm 9 and the springs 10 and 11.

Pivoted upon a lug 15, mounted on the side of the frame 2 is a holding member 16, having a face 17, which bears normally against the lower outer portion of the disc 14, so as to hold the disc in fixed position upon the aircraft. A spring 18 urges this stop or holding member 16 in a clockwise direction so as to hold it against the disc or reference 14. The holding member 16 is periodically temporarily released from engagement with the disc 14 by a cam 19, which rotates in a horizontal plane and which is mounted upon the shaft 7. The gear 20 is rotated constantly by means of a worm 21 on the shaft 22, which is driven by an electric motor 23, connected as indicated to a variable resistance 24, switch 25, battery 26, so that when the switch is closed the motor will continuously operate to cause the rotation of the gear 20, thereby periodically causing the cam 19 to pass beneath the lower end of the holding member 16 and release the reference disc 14, so that the reference disc may be caused to assume its normal relation with the sighting device by means of the two springs 10 and 11, in case the sighting device should have been turned about a vertical axis.

Mounted upon the reference disc 14 are a pair of electrical resistances 27 and 28, which are contacted by the end of the arm 9. The arm 9 is electrically connected at one end to the conductor 29, so that a circuit will be completed through the pilot's indicator 30, which is in the nature of a differential voltmeter and through conductor 31, which is connected to the junction of the two resistances 27 and 28 at the point 32. With the arm 9 in the position shown in Fig. 2, that is, in its intermediate position upon the resistances, which is also the normal relation, the pilot's indicator 30 would show a zero indication as indicated in Fig. 2. With the arm 9, however, displaced from its normal relation with the reference 14, the corresponding indication will be registered upon the pilot's indicator 30, thus making known to the pilot in which direction to turn the ship and the extent of turning movement required to cause the ship to assume a course so as to be directed toward the object sighted.

The operation of the device is as follows:

The bomber or observer first adjusts the sighting device so that it is approximately aligned with the plane direction of travel in relation to the ground. The switch 25 is then closed so as to start the motor 23 in operation. The reference disc 14 as soon as it is first released by the counter-clockwise rotation of the holding member 16, by means of the cam 19, will be moved by means of the springs 10 and 11, so as to assume its normal relation with the sighting device. This operation takes place long before the bomber is in the proximity of the object of the bomb. When the object is sighted the bomber makes known to the pilot that the bombing operation is to be started. He then turns the sighting device so as to sight the objective through the sighting tube 4 and thereafter merely moves the sighting tube 4 so as to sight the objective at all times until the bomb is released. When the sighting device is moved as just indicated so as to be aligned with the objective, the relative displacement of the plate 3 and the arm 9 of the sighting device, in relation to the reference disc 14 causes an indication on the pilot's directing instrument 30, which will be proportional to the amount of movement of the sighting device, and thus indicate to the pilot the extent of movement necessary to so position the plane that it will be flying directly towards the objective. After sufficient time interval has elapsed to permit the pilot to note the indication on the indicating instrument 30 and change the course of the ship, the constant rotation of the gear 20 will cause the cam 19 to release the holding member 16 from the reference disc 14 and the reference disc 14 will then assume its normal relation with the sighting device and cause a zero indication on the instrument 30 if the ship is directed so as to fly exactly towards the target. In case the ship has not been turned to the proper angle and is not flying towards the objective, after it has traveled a very short distance and while the bomber is maintaining the objective through the tube 4, a relative displacement of the sighting device from the reference disc 14 will be caused. For example, assuming the plane to be in the position indicated at $a$ in Fig. 4, the objective $o$ is sighted through the tube 4 and if the plane is flying along the line $ab'$, instead of directly towards the target it will be clear that the sighting device will be moved through a small angle $oa'c'$, as the plane travels from point $a$ to point $a'$. At the point $a$, the sighting device and the reference disc were in their normal relation. At the point $a'$, the relative displacement of the sighting device causes the indication upon the pilot director to show him that he must turn the plane so as to fly more to the left so that his line of flight in relation to the ground will be directly over the object $o$. He therefore turns the vertical rudder and causes the plane to fly directly towards the object. When in the position $a''$ with the plane flying directly towards the object, the line of sight of the tube 4 indicated by the line $oa''c''$ will be in agreement with the position of the reference disc 14, indicated by the line $oa''b''$. There will then be no movement of the indicator 30 since the reference disc 14 and the sighting device will be then in their normal relation, with the arm 9 making contact with the center portion of the two resistances 27 and 28. The pilot will then know that he is flying towards the objective and will maintain this course until such time as the observer releases the bomb or directs the firing of the gun as the case may be.

Indications given on the pilot director will be periodical at definite time intervals according to the time required for the gear 20 to make a complete revolution. This gear 20 may be revolved at any suitable speed in accordance with the altitude so that every several seconds at high altitudes a new indication will be made on the pilot director if the airplane is not flying upon its course. The resistance 24 may be varied so as to increase or decrease the time between successive indications on the pilot directing instrument.

We are aware that our invention is capable of various modifications and uses and do not intend that our invention shall be limited to the precise construction which has been used for purposes of illustration.

We claim:

1. An apparatus of the class described, comprising a sight, means for mounting the same for movement about an axis, a pilot's director, a normally stationary reference member, means for periodically adjusting said reference member to a predetermined position relative to the line of sight, and means interposed between said reference member and the mounting means for actuating said director upon relative movement between the said member and sight.

2. An apparatus of the class described, comprising an observer's sighting device, means for mounting said device to turn on a substantially vertical axis, a pilot's indicator for guidance in steering, a normally stationary reference rotatably mounted on a vertical axis, means for automatically resetting said reference periodically to a normal relation as regards the observer's sighting device, and means interposed between said device and reference for causing an indication on said indicator when said reference and the line of sight of said device are relatively displaced from said normal relation.

3. An apparatus of the class described, comprising an observer's sighting device, means for mounting said device to turn on a substantially vertical axis, a pilot's indicator for guidance in steering, a normally stationary reference rotatably mounted on a vertical axis, means for automatically resetting said reference at definite time intervals to a normal relation as regards the observer's sighting device, means for varying said time intervals, and means for causing said indicator to show the extent that said reference and said sighting device are displaced from said normal relation.

4. An apparatus of the class described, comprising an observer's sighting device, means for mounting said device to turn on a vertical axis, a pilot's director for guidance in steering, a reference, means for rotatably mounting the same on a substantially vertical axis, spring means interconnecting said reference and said device and urging them to a normal relation, means for holding said reference stationary, means for releasing said holding means periodically, and means for causing an indication on said indicator when said reference and the line of sight of said device are relatively displaced from said normal relation.

5. A pilot director for moving craft of the class described, comprising, in combination, an observer's sighting device, means for mounting said device to turn on a substantially vertical axis, a pilot's indicator for guidance in steering, a reference, means for mounting said reference to rotate about a substantially vertical axis, spring means urging said reference and said sighting device to a normal relation, means for holding said reference in fixed position with respect to the craft, means for periodically temporarily releasing said holding means at definite time intervals, means for varying the time intervals at will and means interposed between said device and reference for causing an indication on said indicator when said reference and the sighting device are relatively displaced from their normal relation.

6. A pilot director for moving craft of the class described, comprising, in combination, an observer's sighting device, means for mounting said device to turn on a vertical axis, an electrical indicator mounted adjacent to the pilot for guidance in steering, a reference disc, means for mounting said reference disc to rotate about a vertical axis, a pair of springs urging said reference disc and said sighting device to a normal relation, means for holding said reference disc in fixed position with respect to the craft, a cam, a motor means whereby said motor operates said cam periodically for temporarily releasing said holding means at definite time intervals, means for varying the time intervals at will, and electrical connections between said sight mounting means and said disc for causing an indication on said indicator when said reference disc and the sighting device are relatively displaced from their normal relation.

In testimony whereof we affix our signatures.

ROBERT KAUCH.
CHARLES L. PAULUS.